United States Patent
Ryu et al.

(10) Patent No.: US 8,830,185 B2
(45) Date of Patent: Sep. 9, 2014

(54) METHOD AND APPARATUS FOR SENSING MULTI-TOUCH INPUTS

(75) Inventors: Siwon Ryu, Gyeonggi-do (KR); Sangwon Ji, Gyeonggi-do (KR)

(73) Assignee: Melfas, Inc., Seoul (KR)

( * ) Notice: Subject to any disclaimer, the term of this patent is extended or adjusted under 35 U.S.C. 154(b) by 734 days.

(21) Appl. No.: 12/926,482

(22) Filed: Nov. 22, 2010

(65) Prior Publication Data

US 2011/0069029 A1  Mar. 24, 2011

Related U.S. Application Data (63) Continuation of application No. PCT/KR2009/002708, filed on May 22, 2009.

(30) Foreign Application Priority Data

May 22, 2008  (KR) .......................... 10-2008-0047549

(51) Int. Cl.
    *G06F 3/041*  (2006.01)

(52) U.S. Cl.
    USPC .......................................... 345/173; 345/156

(58) Field of Classification Search
    CPC ......... G06F 3/02; G06F 3/0219; G06F 3/023; G06F 3/014; G06F 19/3406; G06F 3/044; G06F 19/3437; G06F 19/3468; G06F 19/345; G06F 19/3481; G06F 19/3412; G06F 19/3418; G06F 3/016; G06F 3/0412
    USPC .......................................... 345/156, 173–181
    See application file for complete search history.

(56) References Cited

U.S. PATENT DOCUMENTS

| | | | |
|---|---|---|---|
| 5,825,352 A * | 10/1998 | Bisset et al. | 345/173 |
| 7,053,887 B2 * | 5/2006 | Kraus et al. | 345/173 |
| 2003/0063073 A1 * | 4/2003 | Geaghan et al. | 345/173 |
| 2005/0030291 A1 * | 2/2005 | Yanagisawa | 345/173 |
| 2005/0052432 A1 | 3/2005 | Kraus et al. | |
| 2006/0026521 A1 | 2/2006 | Hotelling et al. | |
| 2006/0097991 A1 * | 5/2006 | Hotelling et al. | 345/173 |
| 2007/0120833 A1 * | 5/2007 | Yamaguchi et al. | 345/173 |
| 2007/0132741 A1 | 6/2007 | Chiu et al. | |
| 2007/0268269 A1 | 11/2007 | Chang et al. | |
| 2008/0048990 A1 * | 2/2008 | Cho et al. | 345/173 |

FOREIGN PATENT DOCUMENTS

| | | |
|---|---|---|
| JP | H08211992 | 8/1996 |
| KR | 1020040037247 | 5/2004 |
| KR | 1020080014841 | 2/2008 |
| WO | 0073984 A1 | 12/2000 |
| WO | 2005114369 A2 | 12/2005 |

OTHER PUBLICATIONS

European Search Report dated Oct. 1, 2012.

* cited by examiner

*Primary Examiner* — Duc Dinh
(74) *Attorney, Agent, or Firm* — Bacon & Thomas, PLLC (57) ABSTRACT

A method for sensing two or more touch inputs includes receiving sensing signals of the touch inputs from plural sensing electrodes, calculating a value dependent on a distance between the touch inputs based on the received sensing signals, and determining the existence of the two or more touch inputs if the calculated value is more than or equal to a threshold value. The plural sensor electrodes include a pair of sensing electrodes that correspond to same coordinates on a first axis, and the sensing signals are received from the pair of sending electrodes along the first axis.

14 Claims, 7 Drawing Sheets

METHOD AND APPARATUS FOR SENSING MULTI-TOUCH INPUTS

This application is a Continuation Application of PCT International Application No. PCT/KR2009/002708 filed on Mar. 22, 2009, which designated the United States.

FIELD OF THE INVENTION

The present invention relates to a method and apparatus for sensing multi-touch inputs, and more particularly, to a method and an apparatus for sensing the existence of two or more touch inputs adjacent to each other and determine the positions of the touch inputs.

BACKGROUND OF THE INVENTION

A touch sensing apparatus is used to detect the touch of a user's finger or other object and convert it into an electrical signal suitable thereto for providing the same, and is applied to various electronic devices for employing it as an input device. For example, the touch sensing apparatus is applied to laptop computer for an input means, in place of a mouse, for controlling the movement of a cursor, or is coupled to a display device for an input means to directly select and implement an icon or menu displayed on a screen of the display device. In addition, the touch sensing apparatus is also used as means for substituting for a button. In recent years, with the trend of large screen and small size in electronic devices, it is increasingly often the case that an input device, such as a keypad, is omitted but a touch input device (e.g., a touch screen) coupled to the display is used as a sole input means (or at least a main input means).

Expansion of application of such a touch sensing apparatus accompanies a change in input schemes, one example of which is a method of sensing two or more touch inputs. A conventional touch sensing apparatus detects only single touch input and also receives restricted inputs. For example, a touch sensing apparatus substituted for a mouse merely controls the position of a cursor through a touch input, and has to use a separate button for an input produced by a click. However, latest touch sensing apparatuses are able to simultaneously detect two or more touch inputs, one for controlling the position of a cursor and the other one for performing a click input. Further, a rotation command to rotate a subject on a screen is implemented by using one input established as a reference and the movement of another input, and an expanding or contracting command for a subject on a screen is also implemented depending on a change in the distance between two inputs.

In order to detect two or more touch inputs, the existence of two or more touch inputs has to be determined first, which is known from a prior art such as a method based on the maximum and minimum values of a signal generated by two inputs. For instance, U.S. Pat. No. 5,825,352 discloses a method of measuring two maxima and minima between the maxima and determining the existence of two or more touch inputs based on the maxima and minima.

However, it is difficult to apply the method of using the maxima and minima if two inputs are adjacent to each other. For example, if two touches are close, the minima between the maxima may have a greater value than expected one because signals caused by such touches overlap with each other and, therefore, it becomes very difficult to set a threshold value for discriminating the signals from noises and sensing the touches as two-touch input. Therefore, in order to detect adjacent touch inputs by the method using maxima and minima, sensing electrodes for sensing touches need to be densely disposed to increase the resolution. However, this measurement causes an increase of manufacturing costs, which results in a complicated routing between electrodes and circuits, and thus makes it difficult to manufacture small-sized devices. Particularly, for a touch screen, which is one of touch sensing apparatuses, such complicated routing typically increases the area of a wiring portion disposed on the outer periphery (so-called bezel) of a display device, thereby hindering the expansion of the screen.

SUMMARY OF THE INVENTION

It is, therefore, an object of the present invention to provide an apparatus and a method for sensing multi-touch inputs, which is capable of sensing two or more adjacent touch inputs without increasing the density of sensing electrodes.

Another object of the present invention is to provide an apparatus and a method for sensing multi-touch inputs, which is capable of exactly identifying the positions of two or more touch inputs.

In accordance with a first aspect of the present invention, there is a method for sensing two or more touch inputs, the method including: receiving sensing signals of the touch inputs from plural sensing electrodes; calculating a value dependent on a distance between the touch inputs based on the received sensing signals; and determining the existence of the two or more touch inputs if the calculated value is more than or equal to a threshold value.

Preferably, the sensing electrodes include sensing electrode pairs corresponding to the same coordinates on a first axis, and said receiving sensing signals includes receiving the sensing signals from the sensing electrode pairs along the first axis.

Preferably, said calculating a value dependent on a distance between the touch inputs includes calculating the distance-dependent value based on the distribution of the intensities of the sensing signals along the first axis.

Preferably, the sensing electrodes are arranged to correspond to coordinates on first and second axes not parallel to each other, and said receiving sensing signals includes receiving the sensing signals from the sensing electrodes along the first and second axes.

Preferably, said calculating a value dependent on a distance between the touch inputs includes obtaining the distance-dependent value based on the distribution of the intensities of the sensing signals along at least one of the first and second axes.

Preferably, the method further includes providing a value set by a user as the threshold value.

Preferably, the distances between adjacent sensing electrodes among the sensing electrodes are less than or equal to a predetermined minimum touch area.

Preferably, the method further includes if it is determined that there exist the two or more touch inputs, calculating a position of a center point between the two or more touch inputs; and determining positions of the touch inputs based on the position of the center point and the distance-dependent value between the touch inputs.

Preferably, the method further includes if it is determined that there exist the two or more touch inputs, calculating a position of a reference point between the two or more touch inputs; and dividing the sensing signals into plural sensing signal groups with reference to the reference point and calculating positions of the touch points from the each divided sensing signal groups.

Preferably, said calculating a position of a reference point includes calculating, as the reference point, a point at which intensities of the sensing signals have a minimum value.

Preferably, said calculating positions of touch points includes calculating a weighted mean with regard to at least one axis using the sensing signals as weighted values.

Preferably, said calculating positions of touch points includes calculating a ratio of the sensing signals of adjacent sensing electrodes on at least one axis.

Preferably, the sensing signals are representative of a capacitance change by a touch.

In accordance with a second aspect of the present invention, there is provided a method for sensing two or more touch inputs, the method including: receiving sensing signals from plural sensing electrodes; calculating a value dependent on a distance between the touch inputs from the received sensing signals; calculating from the received sensing signals a position of a center point between two or more touch inputs; and determining positions of the touch inputs based on the position of the center point and the value dependent on a distance between the touch inputs.

Preferably, the sensing electrodes include sensing electrode pairs corresponding to the same coordinates on a first axis and wherein said receiving sensing signals includes receiving the sensing signals from the sensing electrode pairs along the first axis.

Preferably, said calculating a value dependent on a distance between the touch inputs from the received sensing signals includes calculating the distance-dependent value based on the distribution of the intensities of the sensing signals along the first axis.

Preferably, the sensing electrodes are arranged to correspond to coordinates on first and second axes not parallel to each other, and wherein said receiving sensing signals includes receiving the sensing signals from the sensing electrodes along the first and second axes.

Preferably, said calculating a value dependent on a distance between the touch inputs from the received sensing signals includes calculating the distance-dependent value based on the distribution of intensities of the sensing signals along at least one of the first and the second axes.

Preferably, the distances between adjacent sensing electrodes among the sensing electrodes are less than or equal to a predetermined minimum touch area.

Preferably, the method further includes determining the existence of the two or more touch inputs if the distance-dependent value is more than or equal to a threshold value, wherein said calculating a position of a center point is executed if it is determined that there exist the two or more touch inputs in said determining the existence of the two or more touch inputs.

Preferably, the method further includes providing a value set by a user as the threshold value.

Preferably, the sensing signals are representative of a capacitance change by a touch.

In accordance with a third aspect of the present invention, there is provided a method for sensing two or more touch inputs, the method including: receiving sensing signals through plural sensing electrodes; dividing the sensing signals into plural sensing signal groups; and calculating a position of at least one touch input from at least one of the divided sensing signal groups.

Preferably, said dividing the sensing signals includes dividing the sensing signals about a point at which intensities of the sensing signals have a minimum value.

Preferably, said dividing the sensing signals includes determining a center point of the two or more touch inputs, and dividing the sensing signals with reference to the center point.

Preferably, said calculating a position of at least one touch point includes calculating a weighted mean with respect to at least one axis using the sensing signals as weighted values.

Preferably, said calculating a position of at least one touch point includes calculating a ratio of the sensing signals between adjacent sensing electrodes with respect to at least one axis.

Preferably, the sensing electrodes include sensing electrode pairs corresponding to the same coordinates on a first axis and wherein said receiving sensing signals includes receiving the sensing signal from the sensing electrode pairs along the first axis.

In accordance with a fourth aspect of the present invention, there is provided a touch sensing apparatus for sensing touch inputs using any one of the methods as described above.

In accordance with a fifth aspect of the present invention, there is provided a touch sensing apparatus for sensing touch inputs as described the methods.

In accordance with the present invention, it is possible to detect two or more adjacent touch inputs without increasing the density of sensing electrodes. In addition, the positions of two or more touch inputs can also be exactly identified. Accordingly, the apparatus and method of the present invention can be applied at low costs to various sizes of electronic devices.

DETAILED DESCRIPTION OF THE EMBODIMENTS

Hereinafter, embodiments of the present invention will be described in detail with reference to the accompanying drawings. However, these drawings are only illustrative and the present invention is not limited thereto.

Figure 1:
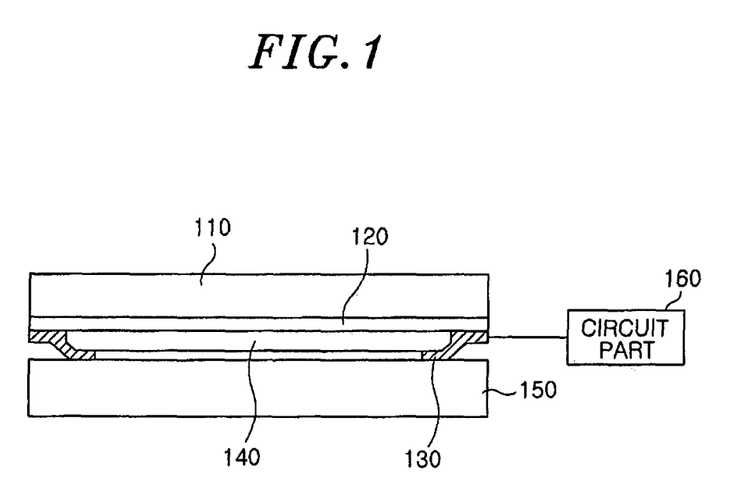
FIG. 1 shows a cross-sectional view of a touch sensing apparatus in accordance with an embodiment of the present invention.

A touch sensing apparatus detects a user's touch, converts the touch into an electrical signal for representing it. This touch sensing apparatus detects changes in pressure, temperature, resistance, capacitance, or optical characteristics according to the user's touch to provide an electrical signal as its output. FIG. 1 illustrates a cross-sectional view of a touch sensing apparatus based on capacitance changes in accordance with an exemplary embodiment of the present invention. It should be noted that the present invention is applicable to any of various types of touch sensing apparatuses based on a variety of touch sensing principles as well as capacitance changes.

The touch sensing apparatus includes a window 110 disposed to protect the apparatus and a sensing electrode 140 disposed on the back surface of the window 110. In case of a touch screen which is a typical example of the touch sensing apparatus, the sensing electrode 140 is generally made of transparent indium tin oxide (ITO), and the window 110 is also made of a transparent acrylic or glass. Therefore, the user can recognize objects displayed on a display 150 disposed on the back surface of the electrode 140, and thus can apply a touch input to the front surface of the window 110 and directly implement operations of user interface components displayed on the display 150. The sensing electrode 140 may be formed on a transparent film 120 by etching or lithography, which is disposed on the back surface of the window 110.

Meanwhile, for a touch sensing apparatus, such as a touch pad, which does not mounted on the display screen, the window 110 may be made of an opaque material, and the sensing electrode 140 may be formed using a flexible printed circuit board (FPCB).

When the user's finger or other touching objects (e.g., stylus) touches the front surface of the window 110, the window 110 and the transparent film 120 are serving as a dielectric material, the finger or other touching object is serving as a positive electrode to forms a predetermined touch area by touching the sensing electrode 140 of a conductive material, and capacitance is then generated. Such capacitance is sensed by a circuit part 160 via wires 130, and the circuit part 160 can detect a touch input depending on a change in the capacitance. Plural sensing electrode may be formed of one or two or more layers to determine two-dimensional coordinates of a touch, and the circuit part 160 receives sensing signals from the plural electrodes and determines the number of touch inputs and the positions of the touch inputs as described hereinafter.

Figure 2:
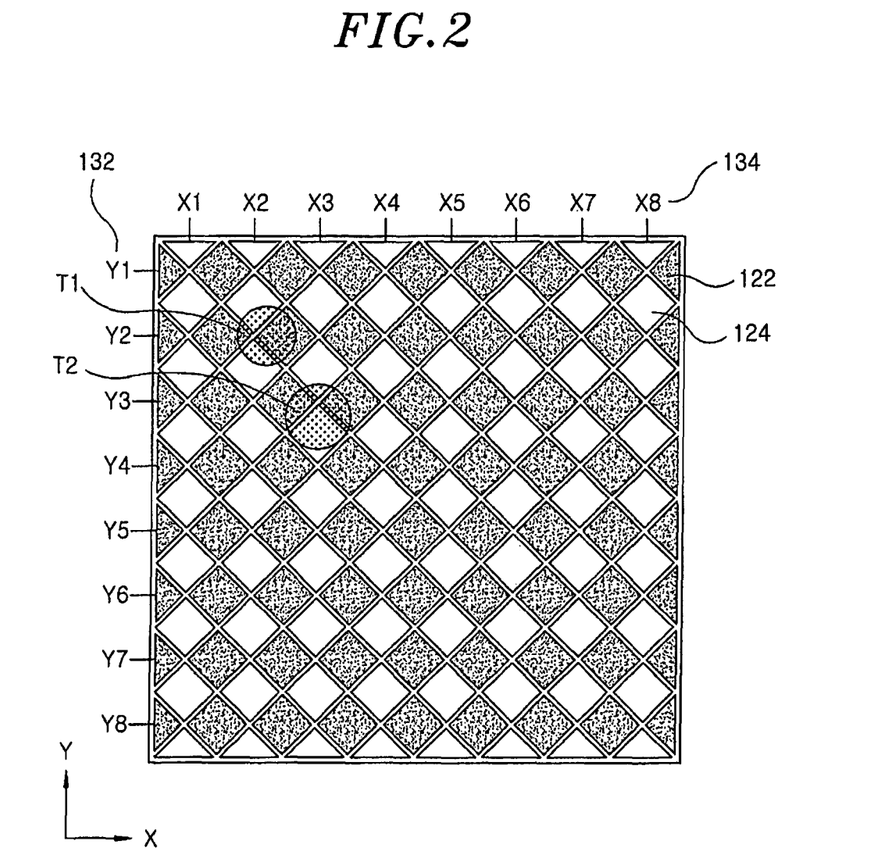
FIG. 2 is a plan view of the touch sensing apparatus in accordance with the embodiment of the present invention.
Figure 3:
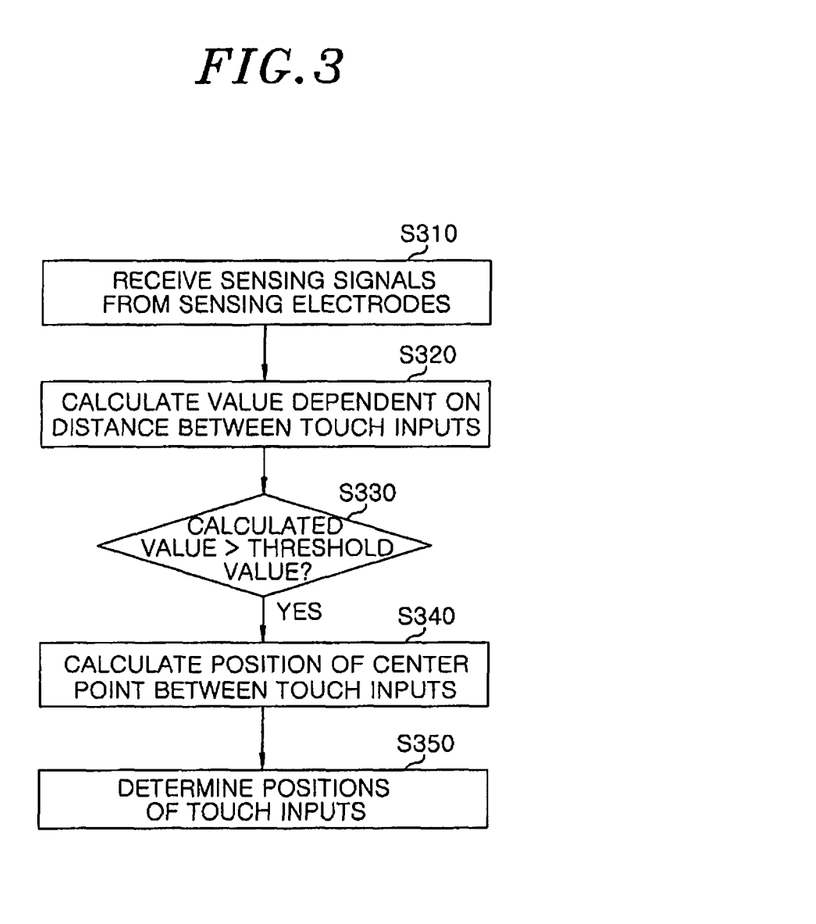
FIG. 3 is a flowchart of describing a touch sensing method applicable to the touch sensing apparatus of FIG. 2 in accordance with an embodiment of the present invention.

FIG. 2 is a plan view of the touch sensing apparatus in accordance with an embodiment of the present invention, and FIG. 3 is a flowchart of describing a touch sensing method applicable to the touch sensing apparatus of FIG. 2 in accordance with an embodiment of the present invention. The touch sensing apparatus of this embodiment includes two electrode layers 122 and 124 each having plural sensing electrodes arranged along two axes, which are not parallel to each other, e.g., X and Y axes, perpendicular to each other, to determine the coordinates of a touch input on the axes. More specifically, the sensing electrodes of an X-electrode layer 124 are connected to those disposed at the same X-positions along the Y-axis and coupled to a wire 134 arranged along the X-axis, and the sensing electrodes of a Y-electrode layer 122 are connected to those disposed at the same Y-positions along the X-axis and coupled to a wire 132 arranged along the Y-axis. Each of the wires 132 and 134 forms respective sensing channels. The circuit part receives sensing signals from the two electrode layers 122 and 124 along the axes on which the respective electrode layers 122 and 124 are arranged, and determines the existence of two or more touch inputs and the positions of the touch inputs.

Figure 4A:
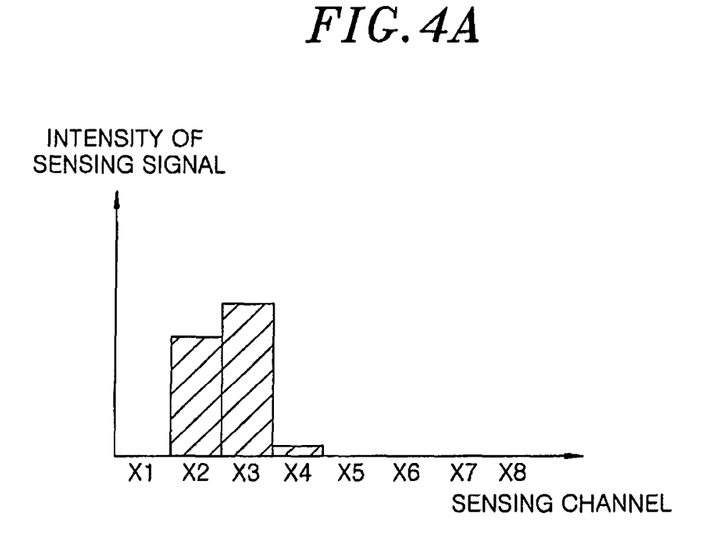
FIG. 4 is a view of exemplary signal profiles applied to the touch sensing apparatus of FIG. 2.
Figure 4B:
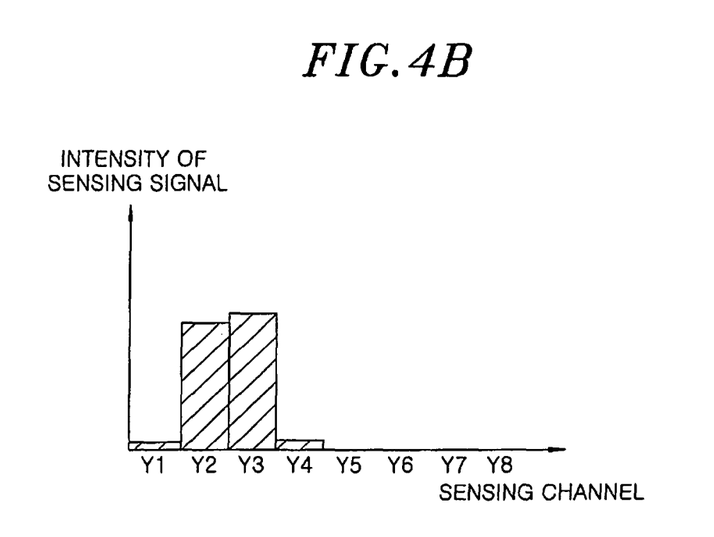

In the touch sensing method of this embodiment, first, a sensing signal is received through a sensing electrode in step S310. For example, if it is assumed that two touch inputs T1 and T2 are entered, the capacitance of the sensing electrodes is changed by the entered touch inputs T1 and T2, and thus sensing signals are generated. To be more specific, the larger the touch area, the higher the capacitance is and the higher the intensity of a sensing signal representing a capacitance change for each sensing channel is. Accordingly, sensing signals having profiles as shown in FIG. 4 are generated by the touch inputs T1 and T2. FIG. 4A depicts a sensing signal obtained for each of sensing channels X1 to X8 of the X-electrode layer 124, and FIG. 4B depicts a sensing signal obtained for each of sensing channels Y1 to Y8 of the Y-electrode layer 122. As illustrated therein, the intensity of the sensing signals is the highest at the sensing channels X2 and X3 and Y2 and Y3 depending on the positions to which the touch inputs T1 and T2 are respectively entered.

Next, in step S320 of the touch sensing method, a value dependent on the distance between the touch inputs T1 and T2 is calculated from the sensing signals. If the value is greater than a predetermined threshold value, it is determined that there exist two or more touch inputs in step S330. In general, a touch input is not entered to only one electrode, but may be entered across two or more electrodes. Therefore, even if sensing signals are received from two or more electrodes, this does not always mean that two or more touch inputs are entered. In this embodiment, a value dependent on the distance between touch inputs is calculated in order to determine the existence of two or more touch inputs, and if the distance is greater than a predetermined threshold value, it is determined that there exist two or more touch inputs.

More particularly, the distance-dependent value can be calculated based on the distribution of the intensities of the detection signals along at least one axis. If a sensing signal profile including the intensity of the sensing signal for each sensing channel illustrated in FIG. 4 is considered as a virtual histogram in which the index of the sensing channel is used as a class value and the intensity of the sensing signal is used as a frequency, a high value of standard deviation in this histogram indicates that the sensing signal is widely distributed across several sensing channels or the distance between peaks of two or more sensing signals is long. Therefore, the standard deviation so obtained is proportional to the distance between touch inputs, whereby a distance-dependent value (or distance value) can be calculated. If the sensing signals as shown in FIG. 4 are received, the distances ΔX and ΔY between touch inputs with respect to the X-axis and the Y-axis can be calculated based on the aforementioned standard deviation by the following Equation using the square root of variance.

$$\Delta X = \sqrt{\frac{\sum_{n=1}^{N_X}(n-m_X)^2 \cdot I_{X_n}}{\sum_{n=1}^{N_X} I_{X_n}}} \cdot D_X$$

$$\Delta Y = \sqrt{\frac{\sum_{n=1}^{N_Y}(n-m_Y)^2 \cdot I_{Y_n}}{\sum_{n=1}^{N_X} I_{Y_n}}} \cdot D_Y$$

[Equation 1]

wherein $N_X$ and $N_Y$ represent the number of sensing electrodes along the X and Y axes, respectively; $I_{X_n}$ and $I_{Y_n}$ represent the intensity of a sensing signal of the X and Y axes, respectively, at an n-th sensing electrode; $D_X$ and $D_Y$ represent the distance between sensing electrodes of the X and Y axes, respectively; and mx and my are the mean values on the histogram representing profiles of the sensing signals of X-axis and Y-axis, respectively, which are given in detail by:

$$m_X = \frac{\sum_{n=1}^{N_X} n \cdot I_{X_n}}{\sum_{n=1}^{N_X} I_{X_n}}$$

$$m_Y = \frac{\sum_{n=1}^{N_Y} n \cdot I_{Y_n}}{\sum_{n=1}^{N_Y} I_{Y_n}}$$

In another embodiment, ΔX and ΔY can be calculated by the following Equation 2 using the mean of absolute deviation.

$$\Delta X = \frac{\sum_{n=1}^{N_X} |n - m_X| \cdot I_{X_n}}{\sum_{n=1}^{N_X} I_{X_n}} \cdot D_X$$

$$\Delta Y = \frac{\sum_{n=1}^{N_Y} |n - m_Y| \cdot I_{Y_n}}{\sum_{n=1}^{N_Y} I_{Y_n}} \cdot D_Y$$

[Equation 2]

From the calculated distances between the sensing electrodes of the X and the Y axes, the value Δ reflecting the distance between touch inputs can be calculated by $\Delta = \sqrt{\Delta X^2 + \Delta Y^2}$. However, it should be noted that this calculation is just achieved because the electrodes of this embodiment consist of an X-electrode layer and a Y-electrode layer and thus it is necessary to obtain all the two-dimensional coordinates, and any one of the distances of the X-axis and the Y-axis can be used if the coordinate (or distance) for any one axis is sufficient.

As discussed above, the thus-calculated value reflecting the distance between touch inputs is compared with a threshold value in step S330, and if the value is greater than the threshold value, it is determined that there exist two or more touch inputs. If the value is less than the threshold value, it is determined there do not exist two or more touch inputs. In this case, the sensing of a single touch input is performed, which will be understood by those skilled in the art although a detailed description thereof will not be given for simplicity.

To improve the accuracy of comparison in this step, other or additional schemes may be used.

For example, in another embodiment, the distances between sensing electrodes can be adjusted so that standard deviation can better reflect the distance between touch inputs. If the distance between the sensing electrodes is too far, plural touch inputs, even if entered, may be detected as single touch input, or the value of standard deviation may be calculated too small. Therefore, it is preferable that the distances between sensing electrodes are set to below the minimum touch diameter (e.g., finger diameter) of a general user. The minimum touch diameter may be determined in advance through a survey of reserved users, data prepared from an organization Technology and Standards, and so on. However, it should be taken into account that an excessive reduction in the distances between the sensing electrodes may cause an increase in the number of the sensing electrodes, thus lowering efficiency.

In still another embodiment, a distance value may not be calculated from a standard deviation, but a value mapped by standard deviation may be used as the distance value. The distance value calculated by the above-mentioned Equations 1 or 2 does not exactly coincide with an actual distance. Thus, if this distance value is used as it is, the possibility of error occurrence may not be excluded. Accordingly, the standard deviation may be mapped to the corresponding distance value and compared with a threshold value. Specifically, a distance value corresponding to a standard deviation can be obtained by using a mapping table created by an experiment in advance.

In addition, the threshold value may be adjusted and customized depending on a user's preference or automatically, as well as being set at the initial stage. As the area of a finger, the pressure of a touch, etc. may vary from user to user, the application of a threshold value settled on the assumption for an average user may fail to provide exact results to all users. Therefore, there is a need to adjust the threshold value so as to reflect the characteristic pattern of use by a user. For instance, the user may enter an exemplary sample input, and the threshold value may be adjusted based on a standard deviation value calculated for the sample input. This adjustment may be performed at the first start-up of the apparatus, or may be performed upon the user's request, or may be performed when there is a request for resetting an apparatus from the user.

If it is determined that there exist two or more touch inputs, the method proceeds to step S340 to determine the positions of the touch inputs. Although this embodiment illustrates that step S340 is performed only when it is determined that there exist two or more touch inputs, a process for determining the positions of the touch inputs may performed in some of embodiments regardless of the determination result.

In step S340 of the method, the position of a center point between the touch inputs is calculated. The coordinate (XM, YM) of the center point can be calculated by using the following Equation from the sensing signals as shown in FIG. 4.

$$X_M = (m_X - 0.5) \cdot D_X$$

$$Y_M = (m_Y - 0.5) \cdot D_Y$$

[Equation 3]

In a next step S350, the positions of the touch inputs are determined based on the, position of the calculated center point and the distance between the touch inputs calculated by Equations 1 or 2. In this embodiment, it is difficult to uniquely determine the coordinates of the two touch inputs because only the position of the center point between the two points and the distances of the X and Y axes between the two points are provided in this step. In particular, if sensing signals for the X and Y axes are separately received (that is, sensing signals are respectively received from the electrodes of the X-axis direction and the electrodes of the Y-axis direction), it may be difficult to uniquely determine the respective touch positions by combining the respectively determined X-axis and Y-axis coordinates. However, a bounding rectangle formed by two pairs of candidate positions of the touch input, given by $$X_{1,2} = X_M \pm \frac{\Delta X}{2} \text{ and } Y_{1,2} = Y_M \pm \frac{\Delta Y}{2},$$

can be obtained, and can be utilized as input information to the apparatus. For example, an increase or decrease in the size of this bounding rectangle can be used for apparatus controls, such as volume control and screen zoom in/out.

In accordance with this embodiment, as described above, the existence of two or more touch inputs is determined based on a value (e.g., standard deviation) reflecting a distance calculated from the sensing signals. Thus, by properly setting a threshold value, the existence of two or more touch inputs can be identified by discriminating adjacent touch inputs without increasing the number of electrodes. In addition, because the positions of the touch inputs can be determined using the threshold value, controlling the apparatus can also be achieved in various ways by using two or more touch inputs.

Figure 5:
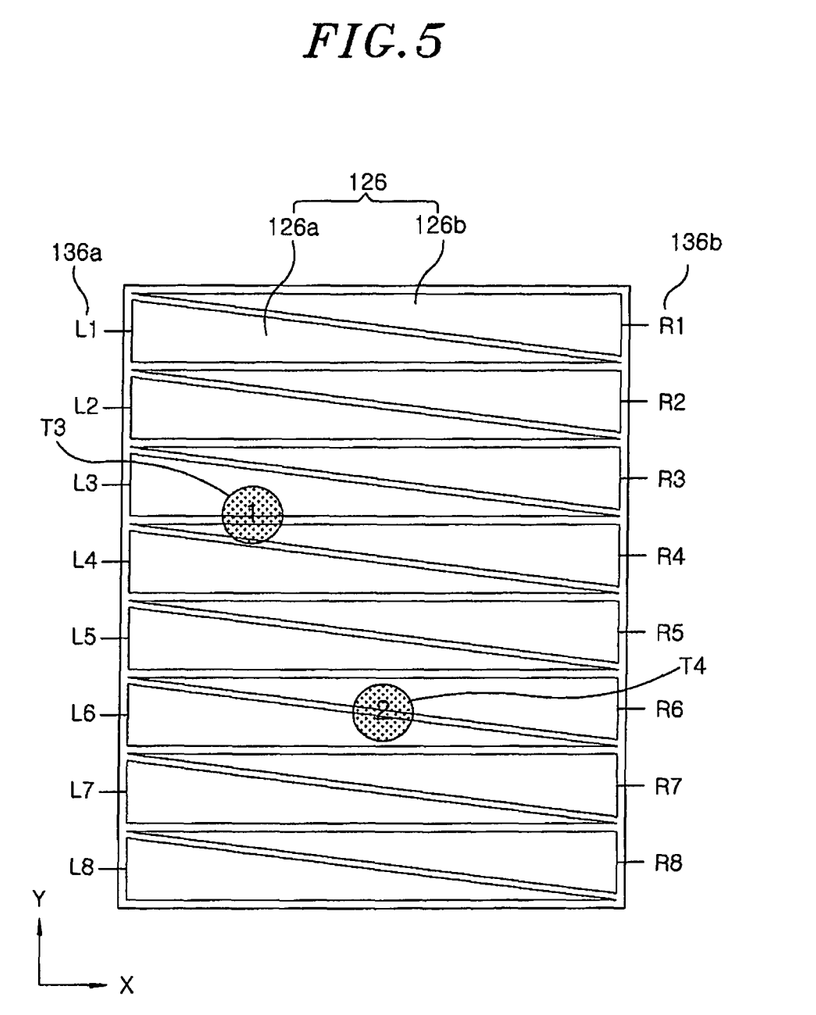
FIG. 5 is a plan view of a touch sensing apparatus in accordance with another embodiment of the present invention.
Figure 6:
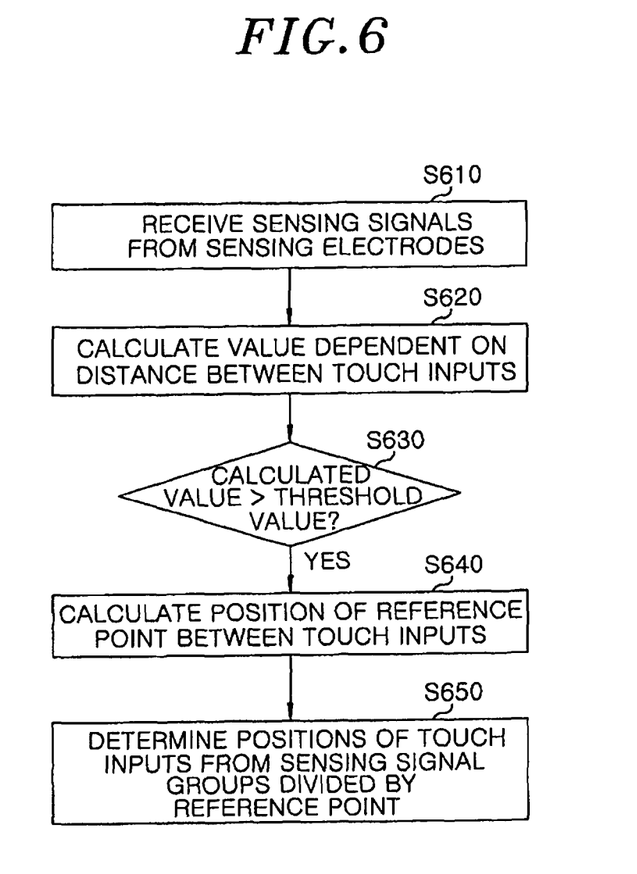
FIG. 6 is a flowchart of describing a touch sensing method applicable to the touch sensing apparatus of FIG. 5 in accordance with another embodiment of the present invention.

FIG. 5 shows a plan view of a touch sensing apparatus in accordance with another embodiment of the present invention. FIG. 6 is a flowchart of describing a touch sensing method which is applicable to the apparatus of FIG. 5 in accordance with an embodiment of the present invention which.

The touch sensing apparatus of this embodiment includes plural sensing electrode pairs 126 corresponding to the same coordinates on a Y-axis. Each of the electrode pairs 126 includes triangular electrodes 126*a* and 126*b*, which are disposed so that the hypotenuses thereof face each other, thus forming a rectangle shape. While the electrode 126*a* and the electrode 126*b* are connected to left and right wires 136*a* and 136*b* constituting separate sensing channels, the electrode pairs 126 correspond to the same coordinates on the Y-axis, respectively. Thus, any input detected by any of these electrodes is identified as being on the same Y coordinate. Meanwhile, all the electrodes are connected to the wires along the Y-axis, and a sensing signal is received along the Y-axis. The distance between the electrodes may be determined based on the minimum touch diameter of the user as in the previous embodiment.

Figure 7:
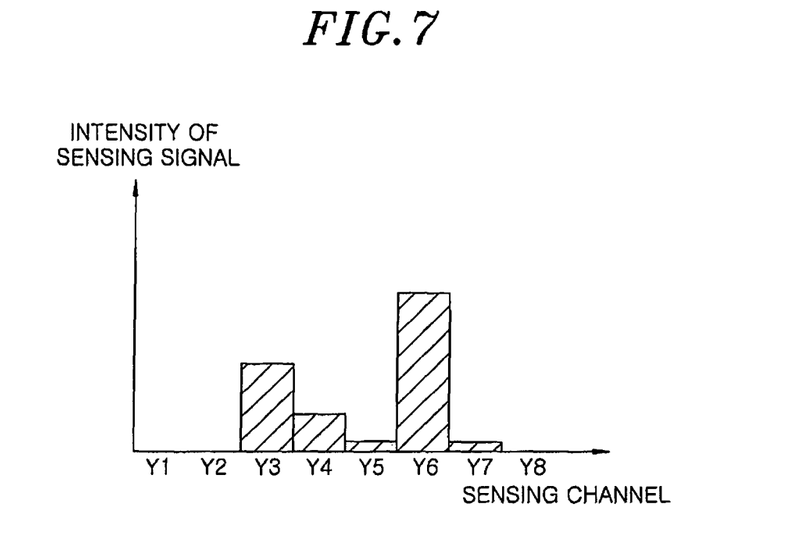
FIG. 7 is a view of exemplary sensing signal profiles applied to the touch sensing apparatus of FIG. 5.

Now, referring to FIG. 6 together, in the method of this embodiment, first, sensing signals are received through plural electrodes in step S610. As described above, the electrodes include electrode pairs corresponding to the same coordinates on the Y-axis. Thus, in step S610, sensing signals are received along the Y-axis. At this point, in order to process sensing signals of the electrodes in one electrode pair as single signal, the sensing signals received by the left and right wires are added to become a sensing signal for each electrode pair. For example, the profiles of sensing signals received when two touch inputs T3 and T4 are entered are illustrated in FIG. 7. As illustrated therein, the peaks of the sensing signals are shown at Y3 and Y6 to which the touch inputs T3 and T4 are input, and the minimum value is shown at Y5 close to the center point thereof.

Next, in step S620 of the method, a value dependent on the distance between the touch inputs is calculated. This value may be based on the distribution of the intensity of the sensing signal as in the previous embodiment. To be more specific, the distribution of the intensities of the sensing signals may be reflected in the standard deviation. The distance between the touch inputs can be calculated by the above Equations 1 or 2. In this embodiment, the distance is calculated for the Y-axis only since the sensing signal is received for the Y-axis only. The calculated distance is compared with a threshold value in step S630. If the distance is greater than the threshold value, it is determined that there exist two or more touch inputs and the method of this embodiment proceeds to step S640 to determine the positions of the touch inputs. If the distance is less than the threshold value, a process suitable for a single touch input is performed.

Like the previous embodiment, a distance value obtained by matching with a mapping table can be used in place of the distance value calculated from the standard deviation, and the threshold value may be customized depending on a user's characteristic.

In another embodiment, meanwhile, the above-described steps S620 and S630 may be omitted. These steps are carried out to determine whether there exist two or more touch inputs. If the determination is unnecessary, for example, there is no possibility at all that a single touch input will be entered, it is possible to omit these steps S620 and S630 and proceed to the step of determining the positions of touch inputs to be described later. The execution of steps S620 and S630 may be determined based on an application to be executed in an electronic device to which the touch sensing apparatus is entered.

In step S640 of the method, the position of a reference point between the two touch inputs is calculated. The reference point may be determined as being a point at which the intensity of a sensing signal has a minimum value or as being the position of the center point of the Y-axis direction between the two touch inputs, calculated by a similar method to Equation 3. In the sensing signal shown in FIG. 7, Y5 may be determined as the reference point. When the reference point is determined in this way, one touch input exists at each side about the reference point. Accordingly, the sensing signals can be divided into two sensing signal groups with reference to the reference point, and one touch input position can be calculated for each group. Specifically, in FIG. 7, one touch input position can be determined using the sensing signals of Y1 to Y4, and another touch input position can be determined using the sensing signals of Y6 to Y8. In one embodiment, only sensing signals over a predetermined value may be selected in order to prevent distortion caused by external noise or the like.

The determination of a touch input position can be carried out in various methods. For example, the X-axis direction position of each touch input can be calculated using the ratio of the intensities of the sensing signals between the sensing electrodes Ln and Rn disposed on left and right sides to face each other, and the Y-direction position of each touch input can be calculated by obtaining a weighted mean of the Y-axis direction position of each sensing electrode using the intensity of the sensing signal as a weighted value. Specifically, the position of the touch input can be determined from the following Equation:

$$X = \frac{\sum_{n=1}^{N} I_{Rn}}{\sum_{n=1}^{N} I_{Ln} + \sum_{n=1}^{N} I_{Rn}} \cdot L_X$$ [Equation 4]

$$Y = \left[ \frac{\sum_{n=1}^{N} n \cdot (I_{Ln} + I_{Rn})}{\sum_{n=1}^{N} (I_{Ln} + I_{Rn})} - 0.5 \right] \cdot D_Y$$

wherein $I_{Ln}$ and $I_{Rn}$ are the intensities of sensing signals received via the left and right wires 136*a* and 136*b*, respectively, and the sum of these intensities ($I_{Ln}+I_{Rn}$) equal to an intensity of a sensing signal shown in FIG. 7. $L_X$ is an X-axis direction length of the electrodes. $I_{Ln}$ and $I_{Rn}$ of the above Equation 4 taken into consideration in the calculation of each touch input position do not represent the intensities of the sensing signals included in the entire profile including all the sensing signal components caused by the two touch inputs, but represent the intensities of sensing signals included in the respective sensing signal profiles separated into two sensing signal groups. The above calculation is entered separately to each of the divided sensing signal profiles.

From Equation 4, the ratio of the sensing signals received from the right (or left) wire to all the sensing signals is calculated for the X-axis to calculate on which of the left and right sides the signals are concentrated. From this calculation, the X coordinates are obtained. The Y-axis coordinates are obtained, by calculating the mean value.

In accordance with this embodiment, even if the multi-touch input sensing apparatus includes only one electrode layer, it can determine the existence of two or more touch inputs adjacent to each other and uniquely determine the respective touch positions. Although a bounding rectangle was obtained in the previous embodiment as described above in connection with FIG. 2, it was impossible to exactly obtain specific touch positions. In this embodiment, however, a sensing signal is divided into plural sensing signal groups, and touch positions are separately calculated from the sensing signals included in each group. Thus, the coordinates of plural touch positions can be uniquely determined without particular control by sensing a signal generated from each electrode. That is, in this embodiment, a sensing signal generated from the Y-axis electrodes is divided into plural sensing signal groups, and the Y-axis coordinate are separately calculated from the sensing signals included in each group. For the determination of the X-axis coordinates, the conventional method may be entered as it is.

Moreover, sensing electrodes of a single layer are included, unlike the previous embodiment, thus enabling the apparatus to be made in small size and reducing manufacturing costs.

Although the invention has been described with reference to particular embodiments, this description is only illustrative and should not be taken as limiting. It is to be appreciated that those skilled in the art may change or modify the embodiments without departing from the scope of the invention. The functional blocks or means described herein can be implemented as various known elements such as electronic circuits, integrated circuits, and application specific integrated circuit (ASIC), and they may be separately implemented or at least two of them may be integrated. The components described as separate means in this specification and claims may be simply functionally embodied and may be physically embodied as a single means and a single component may be embodied as a combination of several components. Also, it should be noted that although the method described herein was described with a specific number and sequence of steps, the sequence thereof may be altered while other steps may be added without departing from the scope of the invention. Further, various embodiments described herein may be implemented separately or in any suitable combination. Accordingly, the scope of the invention should not be limited to the described embodiments, but defined by the appended claims and equivalents thereof.

What is claimed:

1. A method for sensing two or more touch inputs, the method comprising:
   receiving sensing signals of the touch inputs from plural sensing electrodes;
   calculating a value dependent on a distance between the touch inputs based on the received sensing signals by:
   a. calculating a standard deviation from the sensing signals, and
   b. obtaining said value dependent on the distance by mapping a standard deviation to a corresponding said distance using a mapping table created in advance; and
   determining the existence of the two or more touch inputs if the calculated value is more than or equal to a threshold value,
   wherein a distance between the plural sensing electrodes is adjustable.

2. The method of claim 1, wherein said calculating a value dependent on a distance between the touch inputs includes calculating the distance-dependent value based on a distribution of intensities of the sensing signals along a first axis.

3. The method of claim 1, wherein said calculating a value dependent on a distance between the touch inputs includes calculating the distance-dependent value based on a distribution of intensities of the sensing signals along at least one of a first and second axes not parallel to each other.

4. The method of claim 1, further comprising:
   if it is determined that there exist the two or more touch inputs, calculating a position of a center point between the two or more touch inputs; and
   determining positions of the touch inputs based on the position of the center point and the distance-dependent value between the touch inputs.

5. The method of claim 1, further comprising:
   if it is determined that there exist the two or more touch inputs, calculating a position of a reference point between the two or more touch inputs; and
   dividing the sensing signals into plural sensing signal groups with reference to the reference point and calculating positions of the touch points from the each divided sensing signal groups.

6. The method of claim 5, wherein said calculating the position of the reference point includes calculating, as the reference point, a point at which intensities of the sensing signals have a minimum value.

7. The method of claim 5, wherein said calculating the positions of the touch points includes calculating a weighted mean with regard to at least one axis using the sensing signals as weighted values.

8. The method of claim 5, wherein said calculating the positions of the touch points includes calculating a ratio of the sensing signals of adjacent sensing electrodes on at least one axis.

9. A method for sensing two or more touch inputs, the method comprising:
   receiving sensing signals through plural sensing electrodes;
   calculating a value dependent on a distance between the touch inputs based on the received sensing signals by:
   a. calculating a standard deviation from the sensing signals, and
   b. obtaining said value dependent on the distance by mapping a standard deviation to a corresponding said distance using a mapping table created in advance;
   determining the existence of the two or more touch inputs if the calculated value is more than or equal to a threshold value;
   dividing the sensing signals into plural sensing signal groups when the existence of the two or more touch inputs is determined; and
   calculating a position of at least one touch input from at least one of the divided sensing signal groups,
   wherein a distance between the plural sensing electrodes is adjustable.

10. The method of claim 9, wherein said dividing the sensing signals includes dividing the sensing signals about a point at which intensities of the sensing signal have a minimum value.

11. The method of claim 9, wherein said dividing the sensing signals includes:
   determining a center point of the two or more touch inputs; and
   dividing the sensing signals with reference to the center point.

12. The method of claim 9, wherein said calculating the position of at least one touch point includes calculating a weighted mean with respect to at least one axis using the sensing signals as weighted values.

13. The method of claim 9, wherein said calculating the position of at least one touch point includes calculating a ratio of the sensing signals between adjacent sensing electrodes with respect to at least one axis.

14. A touch detection apparatus for sensing touch inputs using the method of claim 1.

* * * * *